(12) United States Patent
Goodall

(10) Patent No.: US 7,575,405 B2
(45) Date of Patent: Aug. 18, 2009

(54) CAPTIVE FASTENER FOR MOUNTING IN SHEET MATERIAL

(75) Inventor: Clive W. Goodall, Kent (GB)

(73) Assignee: BAS Components (GB)

( * ) Notice: Subject to any disclaimer, the term of this patent is extended or adjusted under 35 U.S.C. 154(b) by 281 days.

(21) Appl. No.: 11/087,058

(22) Filed: Mar. 22, 2005

(65) Prior Publication Data
US 2005/0207867 A1    Sep. 22, 2005

(30) Foreign Application Priority Data
Mar. 22, 2004   (GB) ................... 0406390.5

(51) Int. Cl.
*F16B 37/06* (2006.01)
*F16B 37/14* (2006.01)

(52) U.S. Cl. .................... 411/181; 411/429

(58) Field of Classification Search ......... 411/179–181, 411/183, 187, 188, 429
See application file for complete search history.

(56) References Cited

U.S. PATENT DOCUMENTS

| | | | | |
|---|---|---|---|---|
| 969,098 A | * | 8/1910 | Frost ........................... | 285/191 |
| 1,249,948 A | * | 12/1917 | Gruber ........................ | 228/136 |
| 2,096,335 A | * | 10/1937 | Nicholas ..................... | 411/180 |
| 2,255,964 A | * | 9/1941 | Blaho ......................... | 220/601 |
| 3,659,491 A | | 5/1972 | Duffy et al. | |
| 3,916,970 A | * | 11/1975 | Owens ..................... | 152/379.4 |
| 4,036,098 A | | 7/1977 | Schruff | |
| 4,448,336 A | * | 5/1984 | Bott ........................... | 224/309 |
| 4,490,083 A | * | 12/1984 | Rebish ........................ | 411/338 |
| 4,875,815 A | * | 10/1989 | Phillips, II .................... | 411/38 |
| 5,006,025 A | * | 4/1991 | Duran ......................... | 411/183 |
| 5,251,370 A | * | 10/1993 | Muller et al. ................. | 29/512 |
| 5,810,226 A | * | 9/1998 | Lee ............................ | 224/321 |
| 7,182,233 B1 | * | 2/2007 | Graffy et al. ................ | 224/326 |

FOREIGN PATENT DOCUMENTS

| | | |
|---|---|---|
| EP | 0129455 A1 | 12/1984 |
| GB | 1474766 | 5/1977 |
| JP | 2004141826 A2 | 5/2004 |
| WO | WO-03089187 A1 | 10/2003 |

OTHER PUBLICATIONS http://www.bas-components.co.uk/products/flange_technical.html, (Observed Aug. 2, 2005), 6 Pages.
"European Search Report, Application No. EP 05 25 1762", 2 Pages.
"RND Cap Nut", [online]. © 2009 PROFIL Verbindungstechnik GmbH & Co. KG. [retrieved Feb. 5, 2009]. Retrieved from the Internet: <URL: http://www.profil.eu/en/se_md.htm>, 1 pg.

* cited by examiner

*Primary Examiner*—Flemming Saether
(74) *Attorney, Agent, or Firm*—Schwegman, Lundberg & Woessner, P.A.

(57) ABSTRACT

A captive nut is mountable on a vehicle panel and has a blind bore for receiving a fixing, such as a roof rack mounting. The captive nut comprises an outer tubular portion forming a riveting skirt and an inner tubular portion disposed coaxial with the outer tubular portion. A flange extends radially from an end of the outer tubular portion and splines extend radially from the outer tubular portion to the flange. The height of a spline in a direction perpendicular to the axis is substantially the same as the length of the spline in a direction parallel to the nut axis. The thickness of a spline is half the height of the spline in a direction perpendicular to the axis.

13 Claims, 3 Drawing Sheets

CAPTIVE FASTENER FOR MOUNTING IN SHEET MATERIAL

RELATED APPLICATION

This application claims priority under 35 U.S.C. 119 from United Kingdom Application No. 0406390.6, filed Mar. 22, 2004, which is incorporated herein by reference and made a part hereof.

INTRODUCTION AND BACKGROUND

The present invention relates to a captive fastener to be attached to a sheet material. More specifically it relates to a captive nut which is particularly suitable for use when a water tight mounting point is required such as on the roof panel of a vehicle, to take a roof rack, or in the vehicle floor pan.

GB-A-1 474 766 describes a nut which is attached to a sheet metal component by a pressing operation. The nut has a tubular end which is pressed into an aperture in the sheet metal, deforming the rim of the aperture into a cylinder to embrace the periphery of the nut. The tubular end is turned around the rim to secure the nut against removal, while a flange at the other end of the nut prevents the nut being pushed completely through the aperture. Such nuts are sold by the present applicants under the trade mark FLANGEFORM. An alternative method of attaching nuts to sheet material is to weld a standard nut to the sheet material. However, welding is less suited to an automated sheet material assembly process which is based around a press, produces unfavourable fumes and also has the undesirable side effect of weld heat damage to the sheet material.

FIGS. 1 and 2 show prior art captive nuts which are used on a press similar to that described in GB-A-1 474 766. When these nuts are pressed into an aperture in a sheet material, the sheet material around the aperture is deformed and the splines which extend from the periphery of the nut indent the sheet material to resist rotation of the nut. FIGS. 3 and 4 show a high torque version of the captive nut and the difference between this nut and the nut of FIGS. 1 and 2 is that the splines are larger than the splines of the captive nut of FIGS. 1 and 2, providing more resistance to rotation of the nut in the aperture. As the splines indent the sheet material, the seam between the nut and the sheet material is not watertight, making these nuts inappropriate for use as attachment points where water proofing is required.

The nuts 1 are comprised of a tubular portion 3 with a flange 5 extending radially from one end 7 of the tubular portion 3. There are six splines 9 equally spaced around the tubular portion 3, the splines extending radially from the tubular portion 3 to the flange 5.

FIG. 5 is a section view through a press 11 in which the nut 1 of FIG. 1 has been attached to a metal sheet material 13. The sheet material 13 around the aperture 15 through which the nut 1 is pressed is deformed to form a collar 17 and the ends 19 of the tubular portion 3 of the nut 1 are deformed to pinch the end 21 of the collar 17. The splines 9 indent the collar 17, thereby resisting rotation of the nut 1 when a rotational force is applied to the nut 1, for example when screwing a bolt into the nut 1.

The splines 9 of the nut 1 of FIGS. 3 and 4 are larger than the splines 9 of the nut 1 of FIGS. 1 and 2, thereby providing greater rotational resistance than the nut 1 of FIGS. 1 and 2, hence the nut 1 of FIGS. 3 and 4 is used in high torque applications. The inside 37 of the nut 1 is threaded so that a bolt or the like can be attached thereto.

When the splines 9 of the nut 1 of FIGS. 1 to 4 indent the collar 17 the seam 23 between the nut 1 and the collar 17 is not watertight. In order to make the seam 23 watertight it has been found necessary to reduce the size of the splines 9, thereby indenting the collar 17 less than the splines 9 of the nut 1 of FIGS. 1 to 4. However, care is required when reducing the size of the splines 9 so that the splines 9 will still provide sufficient resistance to a rotational force.

A roof rack can be used on a vehicle to increase the carrying capacity of the vehicle. Various methods exist to fix a roof rack to a vehicle. Attachment points are commonly provided to facilitate attachment of a roof rack. The attachment points may typically be a flange or recess running along either longitudinal side of the roof. Often these flanges are masked by a rubber strip or by a plastic strip with flaps which slide back to reveal the flange. In general these attachments points or covering strips can be unsightly and car designers often attempt to disguise these attachment points.

It is one aim of the invention to provide an improved fixing point for a vehicle roof rack.

It is another aim of the present invention to provide a captive nut which forms a watertight seal with a sheet material while resisting rotation when a bolt or other device is screwed into it.

SUMMARY OF THE INVENTION

In one aspect the present invention provides an improved attachment point for attaching a roof rack to the roof of a vehicle. The attachment point can be inconspicuous so that it does not affect the appearance and/or aerodynamic properties of the vehicle. The attachment point can also be watertight to prevent water ingress beyond the roof panel of the vehicle.

Another aspect of the invention provides a vehicle panel, the panel comprising a sheet material and a captive nut, wherein the captive nut is mounted in an aperture in the sheet material and is attached to the sheet material by deforming the nut and the sheet material to form a seam therebetween, wherein the seam is watertight.

Another aspect provides a captive nut for mounting an attachment to a vehicle panel, the nut being captive in an aperture in the panel in use and having a blind bore for receiving a fastener for fastening the attachment, a peripheral flange at one end and a skirt around a outer periphery of the blind bore and deformable to trap a perimeter of an aperture in the roof panel between the flange and the skirt. The skirt is deformed to return around an edge of the panel aperture.

The panel may be a vehicle roof panel and the attachment a vehicle roof rack.

A plurality of splines may be provided at a junction between an underside of the flange which abuts the panel in use and the outer surface of the skirt.

The fastener of the invention may also be mounted in a vehicle floor pan, for example, to receive mountings for seats, rails or other equipment.

By references to a vehicle we are particularly concerned with automobiles, particularly 'cars'—vehicles for domestic and family use—or vans, but the invention may be used in other vehicle types such as busses, trucks or lorries.

Another aspect of the invention provides a captive nut comprising: an outer tubular portion defining a riveting skirt, the outer tubular portion having a first end and an axis; an inner tubular portion disposed coaxially with the outer tubular portion, wherein the inner tubular portion is joined to the first end of the outer tubular portion; a flange extending radially from the first end of the outer tubular portion; and a plurality of splines extending radially from the outer tubular portion to the flange, wherein the length of a spline in a direction parallel to the axis of the outer tubular portion is between half and twice the height of the spline in a direction perpendicular to the axis of the outer tubular portion.

In another aspect, the length of a spline in a direction parallel to the axis of the outer tubular portion may be between 0.75 and 1.5 times the height of the spline in a direction perpendicular to the axis of the outer tubular portion.

The length of the spline in a direction parallel to the axis of the outer tubular portion may be substantially the same as the height of the spline in a direction perpendicular to the axis of the outer tubular portion.

In another aspect, the thickness of a spline is between 0.3 and 0.7 times the height of the spline in a direction perpendicular to the axis of the outer tubular portion. The thickness of the spline may be between 0.4 and 0.6 times the height of the spline in a direction perpendicular to the axis of the outer tubular portion.

The thickness of a spline may be substantially half the height of the spline in a direction perpendicular to the axis of the outer tubular portion.

In another aspect, the inner tubular portion has an internal screw thread. The inner tubular portion may be closed at one end.

Ten or more splines may be provided.

Other aspects and preferred features of the invention will be apparent from the accompanying claims and the following description.

Embodiments of the invention will now be described, by way of example, with reference to the accompanying drawings.

DESCRIPTION OF THE PREFERRED EMBODIMENT

Figure 1:
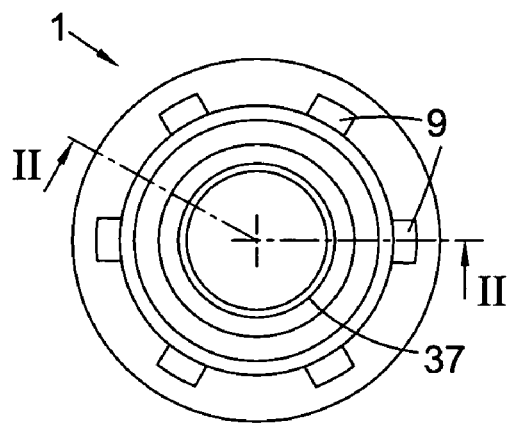
FIG. 1 is an end view of a prior art captive nut.
Figure 2:
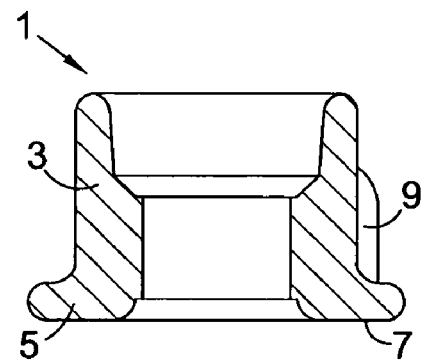
FIG. 2 is a section view along II-II of FIG. 1.
Figure 3:
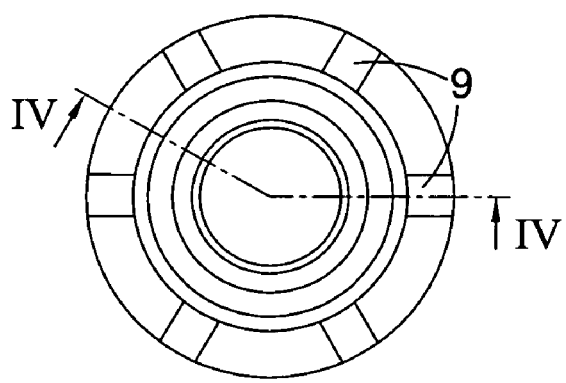
FIG. 3 is an end view of a prior art high torque captive nut.
Figure 4:
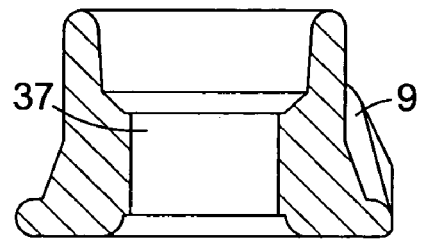
FIG. 4 is a section view along IV-IV of FIG. 3.
Figure 5:
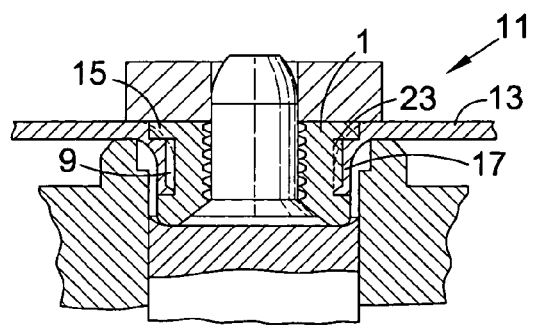
FIG. 5 is a section view through a press in which the nut of FIG. 1 has been attached to a sheet material.
Figure 6:
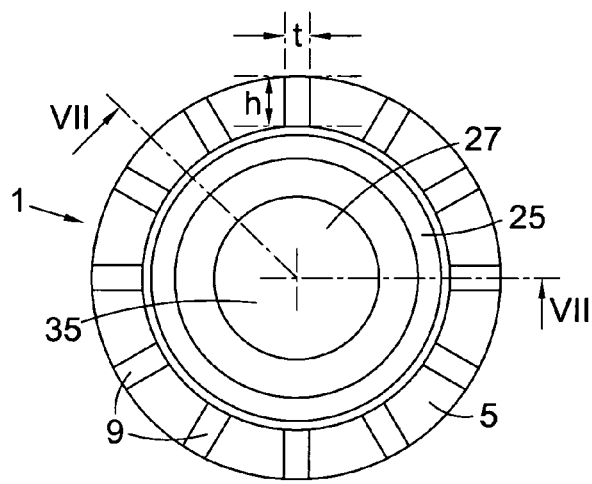
FIG. 6 is an end view of a captive nut according to the present invention.
Figure 7:
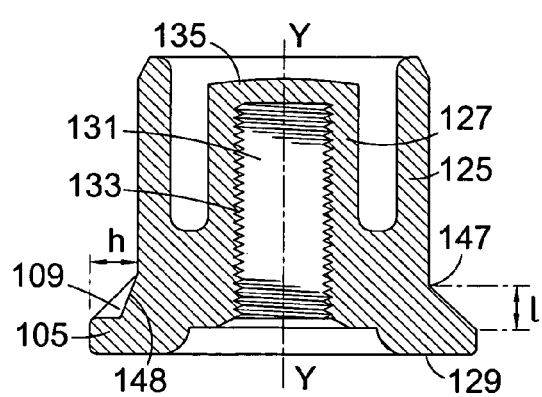
FIG. 7 is a section view along VII-VII of FIG. 6.
Figure 8:
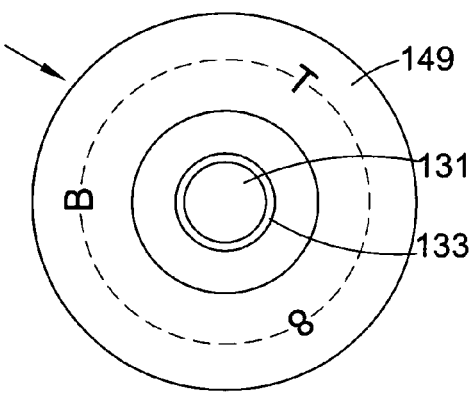
FIG. 8 is an end of view from the other end of the captive nut of FIG. 6.

FIGS. 6 to 8 show a captive fastener 101 according to an embodiment of the invention. The nut 101 is comprised of an outer tubular portion 125, known as a can, and an inner tubular portion 127, known as a spigot, which is joined to the outer tubular portion 125 at a first end 129. A flange 105 extends radially from the first end 129 of the nut 101. The hollow 131 of the inner tubular portion 127 has a screw thread 133 into which an attachment such as a bolt or the like can be screwed. Alternative means for attachment to the fastener, such as a snap fit arrangement or an expansion device engaging an undercut, may be provided in the hollow 131 of the inner tubular portion 127. Unlike the hollow 137 of the nut 101 of FIGS. 1 to 4, in our preferred embodiment the inner tubular portion 27 is closed off at one end 135, thereby making the inner tubular portion 127 watertight even when no attachment or blanking plug is located in the hollow.

The splines 109 of the nut 101 have been reduced in size compared to the splines 109 of the prior art nuts 101 of FIGS. 1 to 4. The length l of a spline 109 in a direction parallel to the axis Y-Y of the outer tubular portion 125 is typically between half and twice the height h of the spline 109 in a direction perpendicular to the axis Y-Y of the outer tubular portion 125. Preferably the length l of a spline 109 in a direction parallel to the axis Y-Y of the outer tubular portion 125 is between 0.75 and 1.5 times the height h of the spline 109 in a direction perpendicular to the axis Y-Y of the outer tubular portion 125. Further preferably, as in this embodiment, the length l of the splines 109 in a direction parallel to the axis Y-Y of the outer tubular portion 125 is substantially the same as the height h of the spline 109 in the direction perpendicular to the axis Y-Y of the outer tubular portion 125.

The thickness t of the splines 109 has also been reduced. Typically the thickness t of the splines is 0.3 to 0.7 times the height h of a spline 109 in a direction perpendicular to the axis Y-Y of the outer tubular portion 125. Preferably the thickness t of the splines is 0.4 to 0.6 times the height h of a spline 109 in a direction perpendicular to the axis Y-Y of the outer tubular portion 125. Further preferably, as in this embodiment, the thickness t of the splines is substantially half the height h of a spline 109 in a direction perpendicular to the axis Y-Y of the outer tubular portion 125.

To compensate for the reduced resistive force provided by the smaller splines 109, the number of splines 109 is preferably at least 10, and in this case twelve. When a nut 101 of M8 body size is attached to a sheet material 113 of thickness of 1.0 mm, it resists a turning force of 30 Nm.

In the particular example shown, the inner thread 133 is M6 size, the outer diameter of the flange 105 is about 17.5 mm and the outer diameter of the can 125 is about 13.3 mm. The splines 109 have an axial length l and radial depth h of about 2 mm. It can be seen that the junction 148 between the flange 105 and can 125 outer wall is sloping or conical. Preferred heights h for the splines 109 are 1 mm to 3 mm, more preferably 1.5 mm to 2.5 mm and preferred depths l are in the proportion set forth above.

Figure 9:
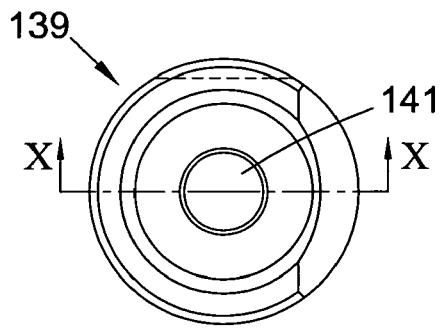
FIG. 9 is an end view of a die to press the captive nut of FIG. 6.
Figure 10:
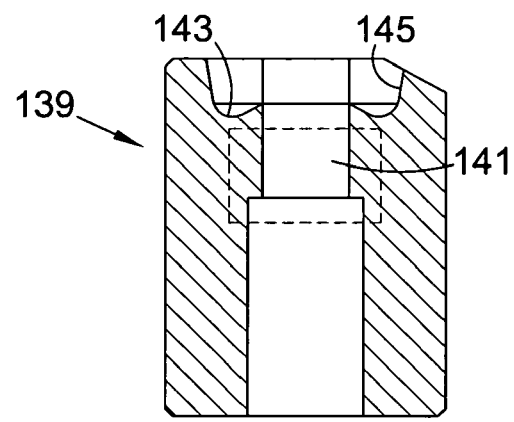
FIG. 10 is a section view along X-X of FIG. 9.
Figure 11:
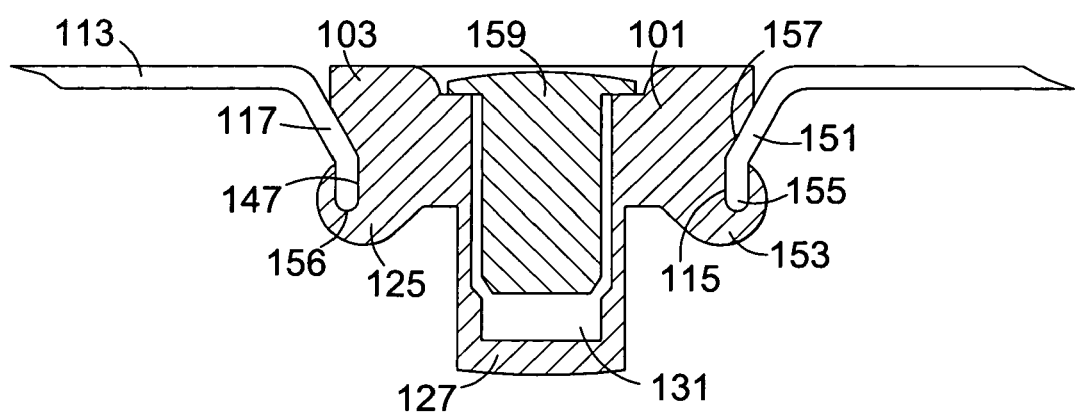
FIG. 11 is a section through the nut of FIG. 6 which has been pressed into a metal sheet material.

FIGS. 9 and 10 show a die 139 used to press the nut 101 of FIGS. 6 to 8 into an aperture in sheet metal and FIG. 11 shows a sheet of metal to which a nut 101 has been attached using this die 139. An aperture 115 is drilled, cut or stamped in a piece of sheet metal 113. Sheet metal 113 may be a vehicle panel body member, particularly for an automobile, such as a roof panel or a floor panel for the vehicle. The nut 101 is located opposite the aperture and pressed through the aperture to deform the rim 151 of the aperture, thereby forming a collar 117 around the peripheral portion 147 of the outer tubular portion 125 which is adjacent to the flange 103. The inner tubular portion 127 of the nut 101 aligns with a bore 141 in the die 139 and the outer tubular portion 125 is deformed by a concave annular portion 143 on the pressing face 145 of the die 139 to form an annular lobe 153 which encompasses the end 155 of the collar 117, thereby sandwiching the metal sheet 113 between the lobe 153 and the flange 105 of the nut 101. The annular lobe 153 returns around the end 155 of the collar 117, enhancing the resistance of the fastener 101 from being pulled out of the sheet metal 113. The seam 157 between the nut 101 and the sheet metal 113 is watertight. The pressing can be performed in a standard press. Relative dimensions for the outer diameter of the nut 103, the aperture 115 and the thickness of the sheet material are best determined by trial as known by those in the art, but approximate guidance can be found on our web site at www.bas-components.co.uk/products/flange_technical.html, which is hereby incorporated by reference along with any document mentioned in the present specification.

In a particularly preferred embodiment, the nut 101 of FIGS. 6 to 8 is fixed into a metal sheet to be used as roof panel of a vehicle to form an attachment point for a roof rack. The inserted nut 101, which forms a watertight seal with the panel, will prevent rainwater etc from penetrating the roof panel at the junction between the nut and the panel. A blanking plug may be used to seal the hollow 131 when an attachment is not in place. We prefer to close the end of the hollow, forming a blind bore, to ensure no water penetrates through the hollow 131. The exposed face 149 of the flange 105 of the nut 101 can be painted the same colour as the panels of the car and a similarly coloured removable plug 159 can be inserted into the inside 131 of the inner tubular portion 127 to provide a flat surface. Plug 159 may be a threaded screw screwed into thread 133 of threaded bore 131. A screw having a hexagon socket in the screw head is preferred for the plug 159. Plug 159 may form the attachment per se for attaching the roof rack or a separate screw or bolt may be provided. Such an attachment point is inconspicuous and watertight and can easily be covered by a trim or the like. The nuts can be attached to the roof panel during the operation of pressing the panel, before installation on the remainder of the vehicle body.

As mentioned above, the nut 101 is also particularly suitable for mounting in a vehicle floor panel, providing a water proof fixing point.

The present invention has been described above by way of example, and modifications can be made within the spirit of the invention.

What we claim is:

1. A captive nut for mounting on a panel of a vehicle, the captive nut comprising:
    a single integral body including a first end, a second end, and an axial direction;
    an inner tubular portion of the body extending in the axial direction, the inner tubular portion being open at the first end and closed at the second end;
    an outer tubular portion of the body integrally joined with the inner tubular portion at the first end and extending in the axial direction around an outer periphery of the inner tubular portion, the outer tubular portion being spaced from the outer periphery of the inner tubular portion, the outer tubular portion axially extending beyond the second, closed end of the inner tubular portion; and
    a peripheral flange at the first end of the body;
    wherein the nut is configured to be captive in an aperture in the panel, the aperture including a substantially cylindrical wall terminating at an edge; and
    wherein the outer tubular portion is configured to be deformable to wrap substantially 180 degrees around the edge of the aperture to trap the edge of the aperture in the panel between the peripheral flange and the outer tubular portion, the outer tubular portion configured to extend a greater distance in the axial direction than in a radial direction of the body with the outer tubular portion wrapped around the edge of the aperture.

2. A captive nut as claimed in claim 1, wherein a plurality of splines is provided at a junction between an underside of the flange which abuts the panel in use and the outer surface of the outer tubular portion.

3. A captive nut as claimed in claim 1, wherein the outer tubular portion defines a riveting skirt having a first end and an axis;
    wherein the inner tubular portion is disposed coaxially with the outer tubular portion;
    wherein the inner tubular portion is joined to the first end of the outer tubular portion;
    wherein the flange extends radially from the first end of the outer tubular portion;
    wherein a plurality of splines extending radially from the outer tubular portion to the flange; and
    wherein a length of a spline in a direction parallel to an axis of the outer tubular portion is between half and twice the height of the spline in a direction perpendicular to the axis of the outer tubular portion.

4. A captive nut as claimed in claim 2, wherein a length of a spline in a direction parallel to an axis of the outer tubular portion is between 0.75 and 1.5 times a height of the spline in a direction perpendicular to the axis of the outer tubular portion.

5. A captive nut as claimed in claim 2, wherein a length of a spline in a direction parallel to an axis of the outer tubular portion is substantially the same as a height of the spline in a direction perpendicular to the axis of the outer tubular portion.

6. A captive nut as claimed in claim 2, wherein a thickness of a spline is between 0.3 and 0.7 times the height of the spline in a direction perpendicular to an axis of the outer tubular portion.

7. A captive nut as claimed in claim 2, wherein a thickness of a spline is between 0.4 and 0.6 times the height of the spline in a direction perpendicular to the axis of the outer tubular portion.

8. A captive nut as claimed in claim 2, wherein a thickness of a spline is substantially half the height of the spline in a direction perpendicular to an axis of the outer tubular portion.

9. A captive nut as claimed in claim 1, wherein the inner tubular portion has an internal screw thread.

10. A captive nut as claimed in claim 2, wherein there are ten or more splines.

11. A one-piece captive nut comprising:
    a deformable outer tubular portion defining a riveting skirt, the outer tubular portion having a first end and an axis;
    an inner tubular portion disposed coaxially with the outer tubular portion, wherein the inner tubular portion includes an open end and a closed end, the open end being integrally joined to the outer tubular portion at the first end of the outer tubular portion, the outer tubular portion being spaced from the outer periphery of the inner tubular portion, the outer tubular portion axially extending beyond the closed end of the inner tubular portion;
    a flange extending integrally and radially from the first end of the outer tubular portion; and
    a plurality of splines extending radially from the outer tubular portion to the flange, wherein the length of a spline in a direction parallel to the axis of the outer tubular portion is between half and twice a height of the spline in a direction perpendicular to the axis of the outer tubular portion;
    wherein the nut is configured to be captive in an aperture of a panel, the aperture including a substantially cylindrical wall terminating at an edge, wherein the deformable outer tubular portion is configured to wrap completely around the edge of the aperture to trap the edge of the aperture of the panel between the flange and the outer tubular portion, the outer tubular portion configured to extend a greater distance in an axial direction of the nut than in a radial direction of the nut with the outer tubular portion wrapped around the edge of the aperture.

12. The one-piece captive nut as claimed in claim 11, wherein the outer tubular portion is configured to wrap around the edge of the aperture of the panel such that the edge of the aperture of the panel is enclosed by the outer tubular portion.

13. The one-piece captive nut as claimed in claim 12, wherein the outer tubular portion is configured to wrap around the edge of the aperture of the panel by about 180 degrees.

* * * * *

UNITED STATES PATENT AND TRADEMARK OFFICE
CERTIFICATE OF CORRECTION

PATENT NO.      : 7,575,405 B2                                                      Page 1 of 1
APPLICATION NO. : 11/087058
DATED           : August 18, 2009
INVENTOR(S)     : Clive W. Goodall It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this

Seventh Day of September, 2010

David J. Kappos
*Director of the United States Patent and Trademark Office*